Nov. 20, 1934.  S. C. BADEN  1,981,261
GLARE SHIELD
Filed April 4, 1932
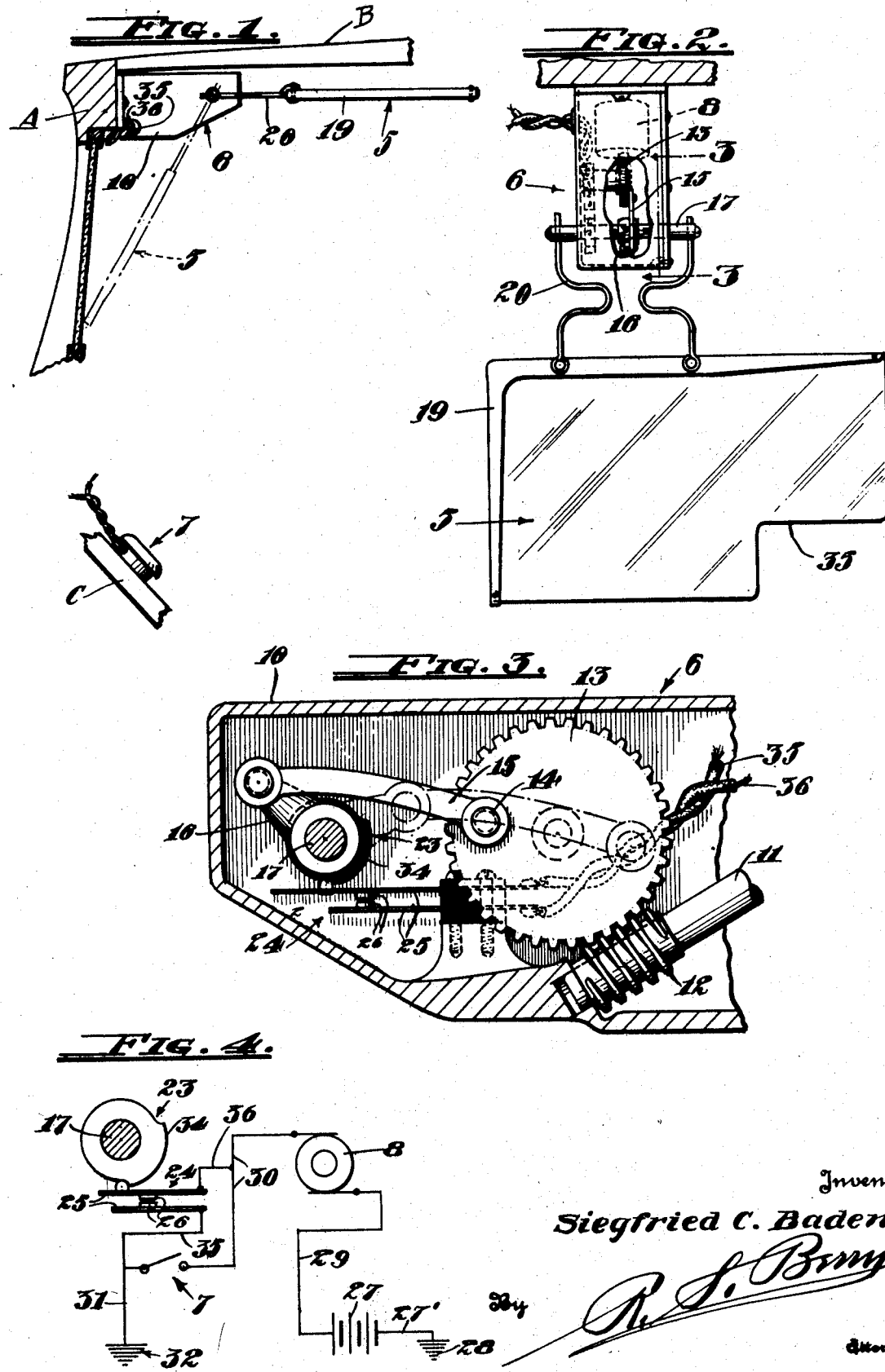
Inventor
Siegfried C. Baden:

Patented Nov. 20, 1934

1,981,261

UNITED STATES PATENT OFFICE 1,981,261

GLARE SHIELD

Siegfried C. Baden, Los Angeles, Calif.

Application April 4, 1932, Serial No. 603,036

4 Claims. (Cl. 296—97)

This invention relates to shields for preventing the glare of the sun or of headlights from "blinding" or confusing the drivers of motor vehicles.

An object of the invention is to provide a remote control motor operated glare shield which may at the will of the driver and through the simple expediency of pushing a button or the like, and without requiring that the attention of the driver be taken from the driving operation, be automatically moved from out-of-the-way position and vice-versa.

A further object of the invention is to provide a power operated glare shield which may be moved from inoperative to operative position at the will of the driver without necessitating that the driver remove his hands from the steering wheel or move in any way out of the usual driving position.

Yet another object of this invention is to provide a novel and efficacious motor means for actuating the glare shield as aforesaid, and wherein said means is started manually by a simple and momentary manipulation of a starting element and thereafter operates and shuts off automatically.

Another object of the invention is to provide a glare shield of the character described which comprises a simply constructed, compact and comparatively inexpensive unit capable of easy attachment to motor vehicles.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Fig. 1 is a fragmentary vertical sectional view of the top and windshield of an automobile, showing in side elevation the glare shield of this invention as when installed;

Fig. 2 is a top plan view of the glare shield;

Fig. 3 is an enlarged sectional view taken on the plane of line 3—3 of Fig. 2;

Fig. 4 is a diagrammatic view of the electrical circuit employed for operating and controlling the glare shield.

The present embodiment of the invention, as shown in the accompanying drawing, comprises generally a glare shield 5, an operating means 6 for moving the shield into and out of operative position and for attachment to the windshield frame A or like part of an automobile, and a remote control switch 7. As here shown the shield is comprised of a piece of glass, celluloid or the like which is treated or formed to be sufficiently transparent to permit of the necessary vision of the driver, while at the same time prevent the passage therethrough of glaring light rays.

Preferably the shield is disposed interiorly of the automobile and normally lies in an out-of-the-way position close to the top B but when moved into operative position will be presented in the line of vision of the driver to shield the latter from blinding light rays as aforesaid.

It is important to note that the remote control switch 7, together with the operating means 6 which latter is preferably actuated by an electric motor 8, provide for a positive and reliable movement of the shield 5 into and out of operative position without necessitating that the driver's attention be taken from the driving operation. As here shown, the remote control switch is mounted on the floor C of the automobile in position to be readily actuated by the driver's foot but it is obvious that this switch could be disposed in other positions likewise readily accessible for hand or foot operation as desired.

While this invention contemplates the use of any suitable operating means which is subject to remote control by a means such as the switch 7 or the like and which causes the shield 5 to be moved into and out of operative position upon manipulation of said switch, I have found that the means 6 as here shown will be satisfactory. Accordingly, said operating means 6 is comprised of casing 10 which is adapted to be screwed onto the part A aforementioned and which houses the motor 8. Fixed on the shaft 11 of the motor is a worm 12 arranged to operate a gear 13 suitably journalled in the casing 10. Eccentrically connected with the gear 13, as at 14, is a pitman 15 which is pivotally connected to a crank arm 16 on a shaft 17. The shaft 17 is journalled in and extends through the walls of the casing 10 whereby its ends are subject to connection with the shield 5. In order to effect such connection the shield 5 is mounted in an angular frame 19 from which wire arms 20 extend to and are connected with said ends of the shaft 17.

With this arrangement it is seen that as the motor is operated and drives the gear 13, the pitman 15 will rock the crank arm 16 and thereby turn the shaft 17 first in one direction then in the other whereby to oscillate the shield 5. However, in order to control the oscillation of the shield whereby, upon movement of the shield from inoperative to operative position or vice-versa, it will remain in the intended position, until the means 6 is again intentionally operated, a control means is provided. This control means comprises a cam 23 arranged on the crank shaft 17 to open and close a switch 24 which controls the motor 8, said switch comprising opposed spring arms 25 having contacts 26 normally spaced apart but adapted to be engaged with one another when the cam forces the spring arms together.

When the operator desires to move the glare shield 5 from inoperative to operative position or vice-versa, he actuates with his foot the switch 7, and, as shown in Fig. 4, current flows from the source 27, through conductor 27' to the ground 28 and through conductor 29 to one side of the motor 8. From the other side of the motor current flows through conductor 30, switch 7, and conductor 31 to the ground 32 and thereby completes the circuit for the motor 8 whereby the latter drives the gear 13. On turning, this gear through the pitman 15 rocks the crank 16 and thereby turns the shaft so that the shield 5 is moved into operative position as shown in dotted lines in Fig. 1. As soon as the motor 8 starts its operation, upon closing the switch 7, the cam 23 through its raised portion 34 depresses the upper spring arm 25 and thereby closes the control switch 24. Current then flows from the ground 32, conductor 31, conductor 35, control switch 24, conductors 36 and 30, motor 8, conductor 29, source 27, conductor 27' to ground 28, thus completing the motor circuit through the switch 24.

In this way the switch 7 need be but momentarily closed and while closed the normally open switch 24 is caused to close whereby to maintain a closed motor circuit when the operator removes his foot from and opens the switch 7. The cam portion 34 is of sufficient length to maintain the circuit closed as aforesaid until the shield moves into its operative position, whereupon said cam portion moves clear of the spring arm 25 and permits the same to spring upward and open the switch 24 and thereby stop the motor. Thus it is seen that the switch 24 is automatically closed incident to closing the starting switch 7, and is opened by the cam 24 after predetermined movement of the shield 5. With the shield in its operative position, to return it to inoperative position, the operator merely momentarily closes the switch 7 and the shaft 17 will move in the reverse direction whereby the portion 34 of the cam will again close switch 24 and also permit said switch to open as aforesaid when the shield is back in its out-of-the-way position.

It is important to note that with the present invention, the driver may quickly effect the movement of the glare shield into and out of position of use through the simple expediency of momentarily closing a push button switch. Owing to this arrangement the driver's attention need not be taken from the driving operation as is usually the case where the driver must use his hands to position or adjust the shield or like device.

It should be noted that the shield 5 has one corner cut away as at 35' to permit the driver to have unobstructed vision without moving his head appreciably or looking through the shield.

I claim:

1. In an automobile glare shield, a rock shaft, a shield carried by said rock shaft, an electric motor, drive means connected with said motor for actuating said rock shaft, manually operable means for closing the electrical circuit for said motor, and a control switch for automatically closing and opening the electrical circuit for said motor, a cam carried by said rock shaft for actuating said control switch; said cam being arranged to effect closing of said control switch during each oscillation of said rock shaft and to permit opening of said switch at the termination of each oscillation of said rock shaft.

2. In an automobile glare shield, a rock shaft, a shield carried by said rock shaft, an electric motor, drive means connected with said motor for actuating said rock shaft in each direction, manually operable means for closing the electrical circuit for said motor, a normally open control switch for closing and opening the electrical circuit for said motor, and a cam carried by said rock shaft for actuating said control switch; said cam being arranged to close said control switch at start of movement of the cam in either direction and to maintain said switch closed during period of the cam dwell and to open said switch at each end of the cam dwell.

3. In an automobile glare shield, a rock shaft, a shield carried by said rock shaft, an electric motor, drive means connected with said motor for actuating said rock shaft in each direction, manually operable means for closing the electrical circuit for said motor, a normally open control switch for closing and opening the electrical circuit for said motor, and a cam carried by said rock shaft, for actuating said control switch; said cam being arranged to close said control switch at the start of movement of said drive means in either direction, and to open said switch at end of movement of the drive means.

4. In an automobile glare shield, a rock shaft, a shield carried by said rock shaft, an electric motor, drive means connected with said motor for actuating said rock shaft in either direction, manually operable means for closing the electrical circuit for said motor, a normally open control switch for closing and opening the electrical circuit for said motor, a cam carried by said rock shaft for actuating said control switch; said cam being arranged to maintain said control switch in a closed position during forward stroke of said drive means and to open said switch at termination of its forward stroke and to maintain said switch in closed position during return stroke of said drive means, and to open said switch at end of the return stroke.

SIEGFRIED C. BADEN.